No. 769,749. PATENTED SEPT. 13, 1904.
F. G. KUNÉ.
WATER PURIFYING APPARATUS.
APPLICATION FILED NOV. 5, 1903.
NO MODEL.
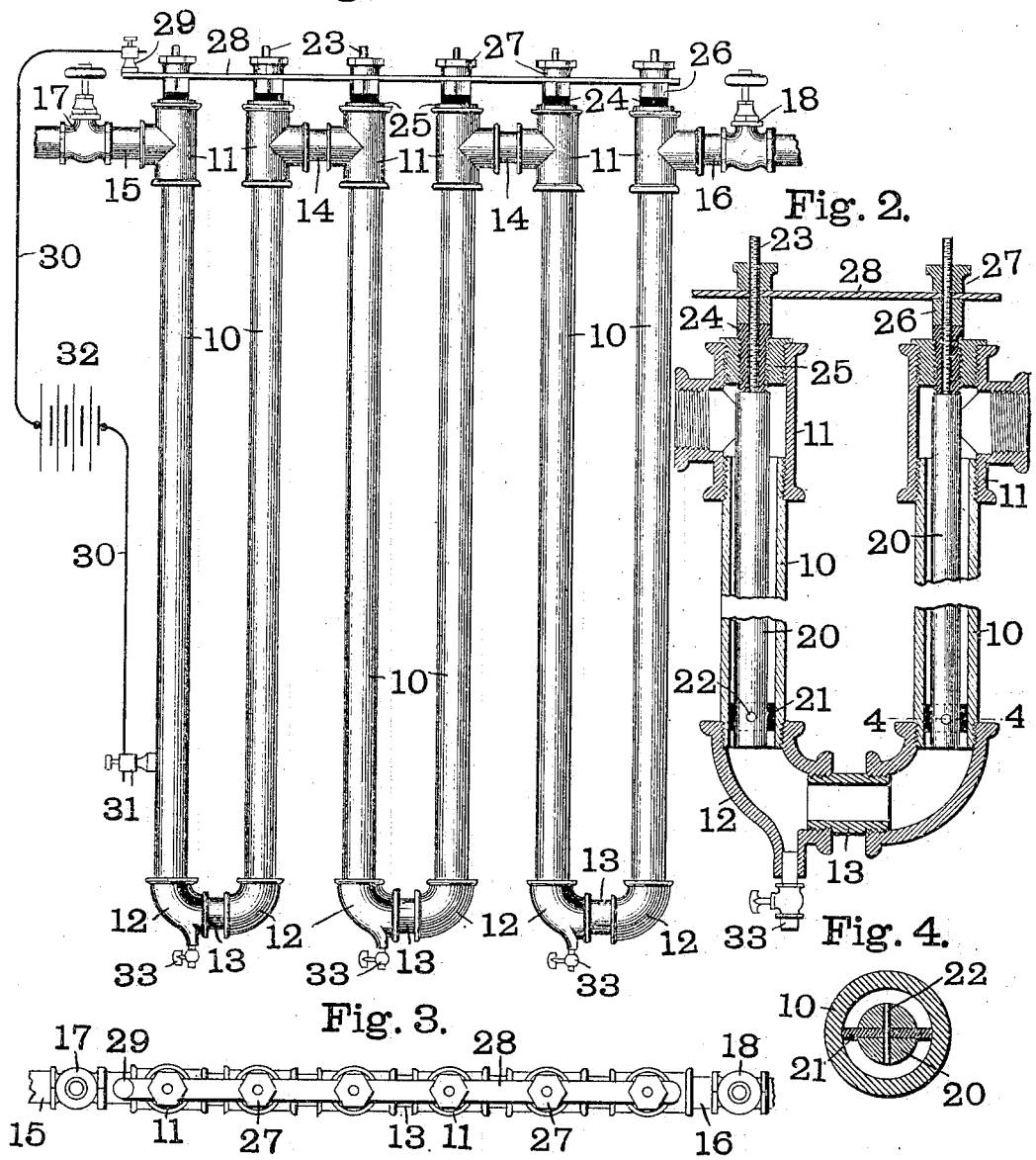

No. 769,749.  
Patented September 13, 1904.

UNITED STATES PATENT OFFICE.

FREDERICK G. KUNÉ, OF NEW YORK, N. Y.

WATER-PURIFYING APPARATUS.

SPECIFICATION forming part of Letters Patent No. 769,749, dated September 13, 1904.

Application filed November 5, 1903. Serial No. 179,387. (No model.)

*To all whom it may concern:*

Be it known that I, FREDERICK G. KUNÉ, a citizen of the United States, residing at the city of New York, borough of Brooklyn, county of Kings, in the State of New York, have invented a certain new and useful Water-Purifying Apparatus, of which the following is such a full, clear, and exact description as will enable any one skilled in the art to which it appertains to make and use the same, reference being had to the accompanying drawings, forming part of this specification.

The principal object of my invention is to so construct an electric water-purifier that the water to be purified will be held between the two electrodes a sufficient length of time to insure a complete purification of the water.

Another object of my invention is to simplify the construction of the purifier.

My invention consists, in part, in the combination, with a plurality of conduits each having an inlet and an outlet, said conduits being imperforate intermediate of the inlets and outlets, of electrodes arranged in said conduits to leave free circulating-space for the water between said conduits and electrodes, and electrical connections connecting said electrodes and conduits with a source of electrical energy.

My invention also consists in certain other novel features and details of construction, all of which are described in the following specification and pointed out in the claims affixed hereto.

In the accompanying drawings, which illustrate one form of purifier made in accordance with my invention, Figure 1 is a side elevation also showing the circuit diagrammatically. Fig. 2 is an enlarged sectional view of two adjacent conduits, the central portion being broken away. Fig. 3 is a top plan view, and Fig. 4 is an enlarged section on the line 4 4 of Fig. 2.

Like marks of reference refer to similar parts in the several views of the drawings.

10 represents a number of conduits, preferably made of metal pipe. These conduits 10 are parallel and are preferably arranged vertically, as shown in Fig. 1. Each of the conduits 10 is provided at its upper end with a T 11 and at its lower end with an elbow 12. The elbows 12 at the lower end of the conduits are connected by means of nipples 13, as shown in Fig. 1. The T's 11 are connected by means of nipples 14, except the T's of the outer conduits, which are connected to inlet and outlet pipes 15 and 16, respectively. These inlet and outlet pipes 15 and 16 are provided with valves 17 and 18 for regulating the flow of water through the conduits 10. Contained within each of the conduits 10 is an electrode 20. The electrode 20 is held out of contact with the conduit 10 at its lower end by means of a strip of insulating material 21, which is placed in a slot in the end of the electrode and held in place by means of a pin 22. The upper end of the electrode 20 is provided with a threaded portion 23, which is preferably reduced in size. This threaded portion 23 is screwed into an insulating-plug 24. The insulating-plug 24 is externally threaded and in turn screws into a bushing 25, which is threaded into the upper end of the T 11. The threaded end 23 of the electrode projects beyond the insulating-plug 24 and is provided with nuts 26 and 27, between which is screwed a conducting-strip 28, which electrically connects all of the electrodes 20. This strip 28 is provided with a binding-post 29, to which is connected one end of an electric circuit 30, the other end of said circuit being connected by means of a binding-post 31 to one of the conduits 10. As the T's 11, elbows 12, and nipples 13 and 14 are all made of conducting material, all the conduits will be electrically connected. Contained within the circuit 30 is a battery 32 or other suitable source of electric energy. One of the elbows 12 of each pair is provided with a drain-cock 33, by means of which the impurities which settle to the bottom of the conduits may be drained off.

The operation of my purifier is as follows: Water enters the left-hand conduit 10 through the inlet-pipe 15 and passes down between the walls of the conduit and the electrode 20. The conduit 10 acts as the other electrode, so that the current passes through the water during its entire travel along the conduit 10. As soon as it has reached the end of the conduit it passes through the elbows 12 and nipple 13 to the next conduit and is again subjected to the passage of the current. In this way it passes through all the conduits and is thus completely purified. The rate of flow of the water may be regulated by means of the valves 17 and 18, so as to further insure the complete purification of the water.

Having fully described my invention, what I claim as new, and desire to secure by Letters Patent of the United States, is—

1. In a water-purifier, the combination with a plurality of conduits each having an inlet and an outlet, said conduits being imperforate intermediate of the inlets and outlets, of electrodes arranged in said conduits to leave free circulating-space for the water between the conduits and electrodes, and electrical connections connecting said electrodes and conduits with a source of electrical energy.

2. In a water-purifier, the combination with a plurality of conduits, each of said conduits having its outlet connected with the inlet of the succeeding conduit so as to discharge the entire flow of water therein, electrodes in said conduits, and electrical connections connecting said electrodes with a source of electrical energy.

3. In a water-purifier, the combination with a plurality of conduits, each of said conduits having its outlet connected with the inlet of the succeeding conduit so as to discharge the entire flow of water therein, of electrodes arranged in said conduits to leave free circulating-space for the water between said conduits and electrodes, and electrical connections connecting said electrodes and conduits with a source of electrical energy.

4. In a water-purifier, the combination with a plurality of parallel and adjacent conduits, each of said conduits having its outlet connected with the inlet of the succeeding conduit so as to discharge the entire flow of water therein, of electrodes in said conduits, and electrical connections connecting said electrodes with a source of electrical energy.

5. In a water-purifier, the combination with a pair of imperforate conduits, the outlet of one of said conduits being connected with the inlet of the other, of a drain-cock situated at the junction of said conduits, electrodes in said conduits but insulated therefrom, and electrical connections connecting said electrodes and conduits with a source of electrical energy.

In testimony whereof I have hereunto set my hand in the presence of the two subscribing witnesses.

FREDERICK G. KUNÉ.

Witnesses:
D. C. BETJEMAN,
JAMES H. BRYSON.